United States Patent [19]

Carey et al.

[11] 4,106,271
[45] Aug. 15, 1978

[54] ROTARY KNIFE STRIPPER

[75] Inventors: Thomas A. Carey, Plainfield; George W. Ridge, La Grange, both of Ill.

[73] Assignee: International Harvester Company, Chicago, Ill.

[21] Appl. No.: 785,131

[22] Filed: Apr. 6, 1977

[51] Int. Cl.² .................................... A01D 45/00
[52] U.S. Cl. .................................. 56/119; 56/98
[58] Field of Search ............... 56/98, 14.3, 119, 62, 56/51, 102

[56] References Cited

U.S. PATENT DOCUMENTS

| 2,949,716 | 8/1960 | Thomson | 56/14.3 |
|---|---|---|---|
| 2,949,717 | 8/1960 | Johannesen | 56/119 |
| 2,999,349 | 9/1961 | Melds, Jr. | 56/119 |
| 3,705,481 | 12/1972 | Willett | 56/98 |
| 3,818,685 | 6/1974 | Stoiessiel et al. | 56/98 |
| 3,961,466 | 6/1976 | Martin et al. | 56/98 |
| 4,009,557 | 3/1977 | Reicks | 56/98 |

OTHER PUBLICATIONS

"Hesston Pull-Type Forage Harvester Model 2000-100", Hesston Corp., Brochure No. FH-2T-775, date stamped 2-24-76.

Primary Examiner—Louis G. Mancene
Assistant Examiner—Paul J. Hirsch
Attorney, Agent, or Firm—Dennis K. Sullivan; F. David AuBuchon

[57] ABSTRACT

In a row crop harvesting header of the type having a crop gathering passage and crop cutting and conveying apparatus associated therewith, the crop cutting apparatus comprising a pair of overlapping rotary disk cutters, a stripper plate is provided behind the cutting nip and has an arcuate stripping edge closely adjacent to and spaced from the periphery of the lower disk and having its forward portion underlapping the upper disk.

5 Claims, 3 Drawing Figures

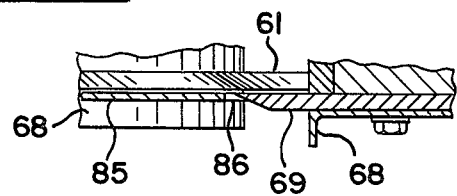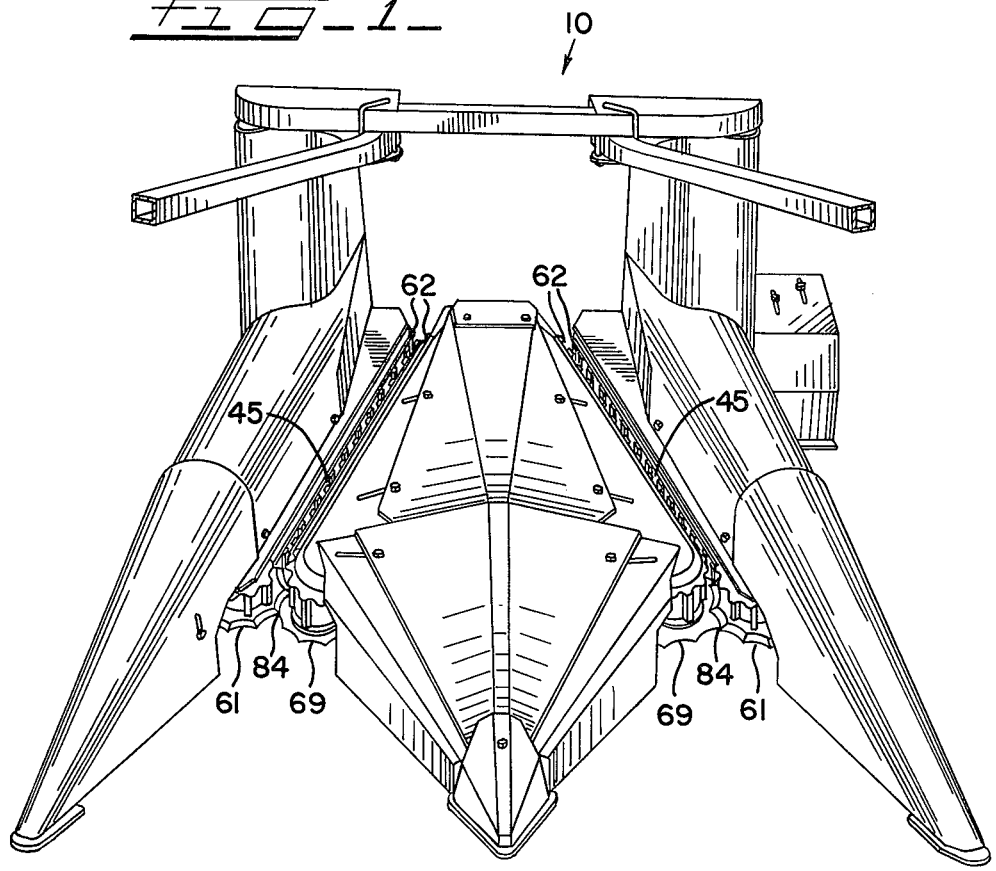

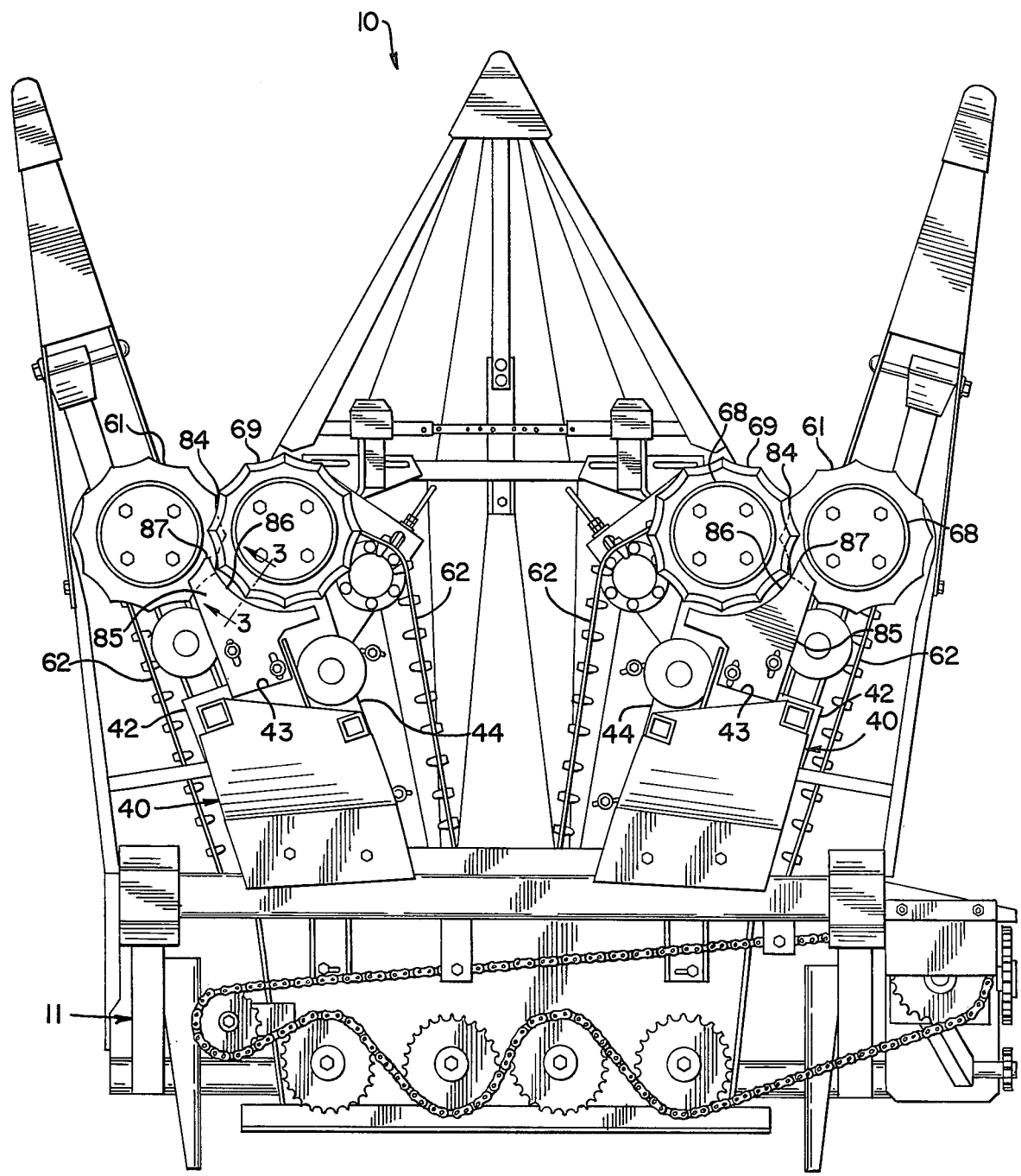
FIG_2

ROTARY KNIFE STRIPPER

CLASS REFERENCE TO RELATED APPLICATION

This application is related to application Ser. No. 690,813, filed May 27, 1976 by Edward A. Fritz and Peter Sammarco and assigned to the assignee hereof now abandoned.

BACKGROUND OF THE INVENTION

This invention relates to row crop harvesting and gathering units of the type commonly used on forage harvesters for harvesting corn and sorghums, and more particularly, to a row crop unit having a crop severing means comprising a pair of overlapping rotary disk cutters and a novel stripper plate used therewith to prevent the accumulation of crop debris in the crop gathering structure.

It is previously known to provide a pair of overlapping rotary disk cutters for severing rows of crop stalks entering the gathering passages of a forage harvester. However, one problem encountered with cutting the crop stalks in this manner is that uncut material such as grasses, weeds, leaves and other debris can pass the cutting disks without being severed. This material tends to collect or impinge on the frame of the gathering passage and interfere with the crop conveying means. Cut debris which is not securely gripped by the gathering means can also drop down and impinge on the frame having a like effect.

SUMMARY OF THE INVENTION

The primary object of the invention described and claimed herein is to provide a forage harvester row crop header having rotary disk cutters with a stripper plate whereby uncut materials passing through the rotary disks are engaged by the stripping edge and passed to the side away from the gathering passage.

A secondary object of the invention is to have said stripper plate serve as a bridge for cut material between the cutting disks and the gathering passage, which has a bottom, to prevent cut material which is not securely gripped by the gathering means from dropping down and impinging on the frame which would impede crop flow.

These and other objects of the invention are specifically met in a row crop harvesting header, such as a two row forage harvester header, having a pair of overlapping cutting disks at the entrances to the gathering passages and conveying means within the passages wherein a stripper plate is mounted to and preferably forms the forward extension of the bottom of each gathering passage, the plate having an arcuate stripping edge closely adjacent to but spaced from the lower disk, the stripping edge extending from a forward portion underlapping the upper disk to a point outside of said crop passage. Preferably, the stripper plate lies in the same plane as the lower disk and the rotating cutting disks have a scalloped periphery to carry debris along the stripping edge.

DETAILED DESCRIPTION OF THE DRAWINGS

These and other objects and advantages of the invention will become apparent upon reading the detailed description thereof and upon reference to the drawings in which:

FIG. 1 is a frontal view of a forage harvester row crop header incorporating the invention;

FIG. 2 is a bottom view of the forage harvester header of FIG. 1; and,

FIG. 3 is a fragmentary section, inverted for clarity, of the stripper plate and lower knife, taken along the line 3—3 of FIG. 2.

DETAILED DESCRIPTION OF THE PREFERRED EMBODIMENT

Turning to the drawings, there is shown a two row, row crop harvesting and gathering unit generally designated 10 of the type adapted for attachment to a forage harvester basic processing unit (not shown). The row crop unit 10 generally comprises a main frame assembly 11 (FIG. 2) including left and right passageway structures 40 mounted thereon and extending generally forwardly but diverging outwardly toward the front. The passage structures 40 comprise laterally inner and outer frame members 42, 44 which are joined by a butt channel 43 enclosing the passageway bottom. The crop passageways 45 thus defined, as seen in FIG. 1, extend in diverging relationship from the rear of the row crop unit to forward openings along the line of travel of the row crop unit whereat they are provided with a pair of rotary disk cutters 61, 69 having scalloped cutting edges, the cutters being rotatably mounted respectively on each side of the passageway from members 42, 44, in overlapping relationship to form a cutting nip 84. Shields 68 in the form of an inverted U-shaped cup of lesser diameter than the disks less the overlap are attached to and extend downwardly from each of the disks to prevent crops from wrapping about the disk mounting bolts.

Rearwardly in the crop passages 45 behind the rotary disk cutters 61, 69, a pair of crop gathering belts 62 run rearwardly along the passages to deliver crops cut by the rotary disk cutters to the rear end of the row unit, the belts 62 being entrained on driving sprockets (not shown) at the rear of the passages and driving the rotary disk cutters through sprockets (not shown) mounted on top of the disk cutters 61, 69. The above structure is provided primarily as environment for the invention herein, and the details of the structure can be found by reference to application Ser. No. 690,813, which is specifically incorporated by reference herein.

In accordance with the invention, a stripper plate 85 is adjustably mounted to and extends from the forward end of the butt channel 43 enclosing the space between the butt channel and the rotary cutting disks 61, 69. The stripper plate 85 is provided with an arcuate stripping edge 86 which is disposed in parallel relationship closely adjacent to but spaced from the outer periphery of revolution of the lower disk cutter 69, preferably lying in the same plane therewith as may be seen in FIG. 3. The forward end 87 of the arcuate stripping edge 86 underlaps the upper cutting disk 61 near the shield 68 and the stripping edge extends rearwardly therefrom along the periphery of the lower disk 69 beyond the limits of the passageway 45, preferably to a point wherein the tangent of the stripping edge 86 is approximately normal to the passageway frame member 44.

As will be seen, uncut crops passing through the cutting disks 61, 69 will be picked up by the stripping edge 86 and carried by the scalloped edges of the disk 69 around the stripping edge and released in the center area of the row unit. To promote this action, the clearance between the stripping edge 86 and the periphery of the cutting disk 69 should be on the order of about 1 mm. The adjustable mounting of the stripper plate is provided for maintaining this clearance as the disks wear in use, the slots in the stripper plate 85 being considerably larger than the shank of the bolts to permit sideways movement.

It will also be noted that since the stripper plate 85 bridges the area between the cutting disks and the butt channel 43, cut crops not securely gripped by the gathering belts 62 cannot drop down and hang up on the front end of the butt channel or on the passageway frame.

Thus, there is been provided in accordance with the invention a novel stripper plate for use on a row crop harvesting header which meets the objects, aims, and advantages setforth above. While the invention has been described in conjunction with a specific embodiments thereof, it is evident that alternatives, modifications and variations will be suggested to those skilled in the art in the light of the foregoing description. Accordingly as intended to imbrace all such alternatives, modifications and variations as fall within the spirit and scope of the appended claims.

What is claimed is:

1. In a row crop harvesting header, said header comprising a frame structure defining at least one crop gathering passage opening forwardly along the line of travel of said header, crop cutting means and crop conveying means for severing a crop stalk from the ground and moving it rearwardly in said passage to the rearward portion of said header, said crop cutting means including upper and lower rotary cutting disks mounted respectively on each side of said passage, a portion of said upper disk overlapping a portion of said lower disk to define a crop cutting nip, the improvement comprising a stripper plate mounted on said frame structure rearwardly of said cutting nip, said stripping plate having an arcuate stripping edge closely adjacent to but spaced from the periphery of said lower disk and extending from a forward portion underlapping said upper disk to a point outside of said crop passage.

2. The invention in accordance with claim 1 and said stripper plate lying substantially in the same plane as said lower disk.

3. The invention in accordance with claim 1 and said cutting disk having a scalloped periphery such that said periphery moves debris along said stripping edge.

4. The invention in accordance with claim 1 and said frame defining a said crop passage having an enclosed lower side rearwardly of said crop cutting means, said stripping plate being mounted to and comprising the forward portion thereof.

5. The invention in accordance with claim 4 and said stripper plate being adjustably mounted to said frame to permit adjustment of said stripping edge relative to said cutting disk periphery as said cutting disk periphery wears.

* * * * *